United States Patent
Foo et al.

(10) Patent No.: US 10,756,880 B2
(45) Date of Patent: Aug. 25, 2020

(54) SYSTEMS AND METHODS FOR ALIGNING RECEIVED DATA

(71) Applicant: Intel Corporation, Santa Clara, CA (US)

(72) Inventors: Kok Yoong Foo, Butterworth (MY); Choon Yee Tan, Bukit Mertajam (MY); Hazem Mohamed Taher Nouh, Bayan Lepas (MY)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/448,912

(22) Filed: Jun. 21, 2019

(65) Prior Publication Data

US 2019/0319777 A1 Oct. 17, 2019

(51) Int. Cl.
*H03D 1/00* (2006.01)
*H04L 27/06* (2006.01)
*H04L 7/00* (2006.01)
*G06F 9/52* (2006.01)

(52) U.S. Cl.
CPC ............ *H04L 7/0087* (2013.01); *G06F 9/526* (2013.01)

(58) Field of Classification Search
CPC ... H04L 7/0087; H04L 25/4902; G06F 9/526; H04Q 11/0066
USPC .......................................... 375/262–264, 342
See application file for complete search history.

(56) References Cited

U.S. PATENT DOCUMENTS

| 4,771,440 A * | 9/1988 | Fromm | ............... H04L 25/4902 332/104 |
| 2017/0245030 A1* | 8/2017 | Lyubomirsky | ..... H04Q 11/0066 |

OTHER PUBLICATIONS

JEDEC Solid State Technology Association; Serial Interface for Data Converters JESD204C; Dec. 2017; pp. 1-294.

* cited by examiner

*Primary Examiner* — Phuong Phu
(74) *Attorney, Agent, or Firm* — Fletcher Yoder, P.C.

(57) ABSTRACT

The present application is directed to an electronic device that has a receiver configured to receive data from a second electronic device and identify potential sync header locations within a portion of the data by performing a mutually exclusive or (XOR) logic operation on a plurality of sequential pairs of bits of the data. Additionally, the receiver is configured to identify sync headers in the data by determining which of the potential sync header locations is shared in subsequent portions of the data.

20 Claims, 13 Drawing Sheets

SYSTEMS AND METHODS FOR ALIGNING RECEIVED DATA

BACKGROUND

This disclosure relates to communication between converters and receivers of integrated circuits.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it may be understood that these statements are to be read in this light, and not as admissions of prior art.

Integrated circuits, such as programmable logic devices may include receivers that receive data from other circuitry, such as other integrated circuits. The other circuitry may include a converter, such as an analog-to-digital converter (ADC) that converts data from an analog domain to a digital domain. The other circuitry may also include a transmitter. The receiver of the integrated circuitry (e.g., programmable logic device) may perform various operations to identify portions of the data.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It may be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it may be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the phrase A "based on" B is intended to mean that A is at least partially based on B. Moreover, unless expressly stated otherwise, the term "or" is intended to be inclusive (e.g., logical OR) and not exclusive (e.g., logical XOR). In other words, the phrase A "or" B is intended to mean A, B, or both A and B.

Integrated circuits, such as programmable logic devices, may communicate with other electronic circuitry. For example, programmable logic devices such field programmable gate arrays (FPGAs) and application-specific integrated circuits (ASICs) may receive data from other circuitry as well as transmit data to the other circuitry (e.g., another integrated circuit). The integrated circuit may include a receiver that detects boundaries defined within received data. The present application is generally directed to techniques that may be utilized to detect the boundaries in data received by receivers of integrated circuits, such as, but not limited to, programmable logic devices. In other words, the present application is directed to techniques for aligning received data, such as data received by a receiver of an integrated circuit. For example, the techniques described herein may be utilized in conjunction with electronic devices described in JEDEC Standard JESD204C ("Serial Interface for Data Converters") and for data transmitted and received in accordance with the JESD204C standard.

Figure 1:
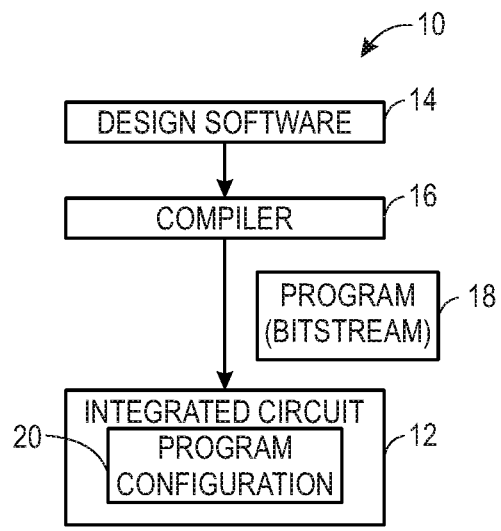
FIG. 1 is a block diagram of a programmable logic device that is programmed with a circuit design, in accordance with an embodiment.

By way of introduction, FIG. 1 illustrates a block diagram of a system 10 that includes a programmable logic device 12 that may detect boundaries in data as described herein. Using the system 10, a designer may implement a circuit design functionality on an integrated circuit, such as a reconfigurable programmable logic device 12, such as a field programmable gate array (FPGA). The designer may implement a circuit design to be programmed onto the programmable logic device 12 using design software 14, such as a version of Intel® Quartus® by Intel Corporation of Santa Clara, Calif. The design software 14 may use a compiler 16 to generate a low-level circuit-design defined by bitstream 18, sometimes known as a program object file and/or configuration program that programs the programmable logic device 12. Thus, the compiler 16 may provide machine-readable instructions representative of the circuit design to the programmable logic device 12. For example, the programmable logic device 12 may receive one or more configuration programs (bitstreams) 18 that describe the hardware implementations that should be stored in the programmable logic device 12. A configuration program (e.g., bitstream) 18 may be programmed into the programmable logic device 12 as a program configuration 20. The program configuration 20 may, in some cases, represent an accelerator function to perform a specialized task, such as video processing, voice recognition, image recognition, vehicle-to-vehicle communication, or other highly specialized tasks. These specialized task may be used in wireless applications, such as for wireless devices operating in a 5G network.

Figure 2:
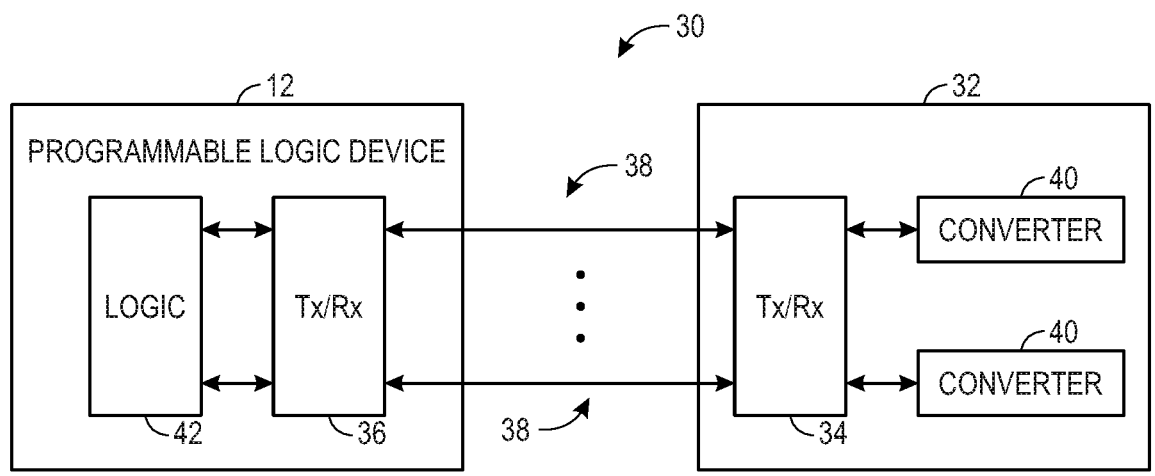
FIG. 2 is a schematic diagram illustrating communication between the programmable logic device of FIG. 1 and other electronic circuitry, in accordance with an embodiment.

Integrated circuits such as the programmable logic 12 may communicate with other integrated circuits or electronic circuitry. FIG. 2 is a schematic diagram of a system 30 in which the programmable logic device 12 is communicatively coupled to, and communicates with, other circuitry 32. The other circuitry 32 may include, but is not limited to, integrated circuits and circuit boards (e.g., printed circuit boards (PCBs) or components thereof (e.g., circuitry included in another integrated circuit or a PCB). As illustrated, the other circuitry 32 includes a transceiver 34 which may communicate with a transceiver 36 of the programmable logic device 12. For example, when the other circuitry 32 is sending data to the programmable logic device 12, the transceiver 34 may function as a transmitter that sends the data to the programmable logic device 12 (e.g., via one or more links 38), in which case the transceiver 36 functions as a receiver. As another example, the transceiver 36 of the programmable logic device 12 may function as a transmitter to send data to the other circuitry 32. In such as case, the transceiver 34 functions as a receiver. Furthermore, it should be noted that while the programmable logic device 12 and other circuitry 32 are respectively depicted as included transceivers 36, 34 that may provide receiver and transmitter functionalities, in other embodiments, separate transmitters and receivers may be utilized.

The other circuitry 32 may include one or more converters 40 that convert data to be communicated to the programmable logic device 12 or received from the programmable logic device 12. For example, the converters 40 may be analog-to-digital converters (ADCs) that convert data from an analog domain to a digital domain. As another example, the converters 40 may be digital-to-analog converters (DACs) that convert data from a digital domain to an analog domain. More particular, in embodiments in which the programmable logic device 12 is an FPGA, the converters 40 may include ADCs that convert data to be sent via the transceiver 34 to the programmable logic device 12 from analog to digital, DACs that convert data received from the programmable logic device 12 via the transceiver 34 from digital to analog, or both.

The transceiver 36 of the programmable logic device 12 may be communicatively coupled to logic 42, which may include programmable logic elements included within the programmable logic device. For example, the logic 42 may be a hardware implementation described by the bitstreams 18. The logic 42 may process communications received via the transceiver 36 and provide data to the transceiver 36 to be transmitted to the other circuitry 32.

Keeping the foregoing in mind, the discussion will turn largely to data and data processing that the transceiver 36 of the programmable logic device 12 may perform, for example, when receiving data from the other circuitry 32. In other words, the techniques discussed below may be performed by a receiver of an integrated circuit such as the programmable logic device 12.

Figure 3:
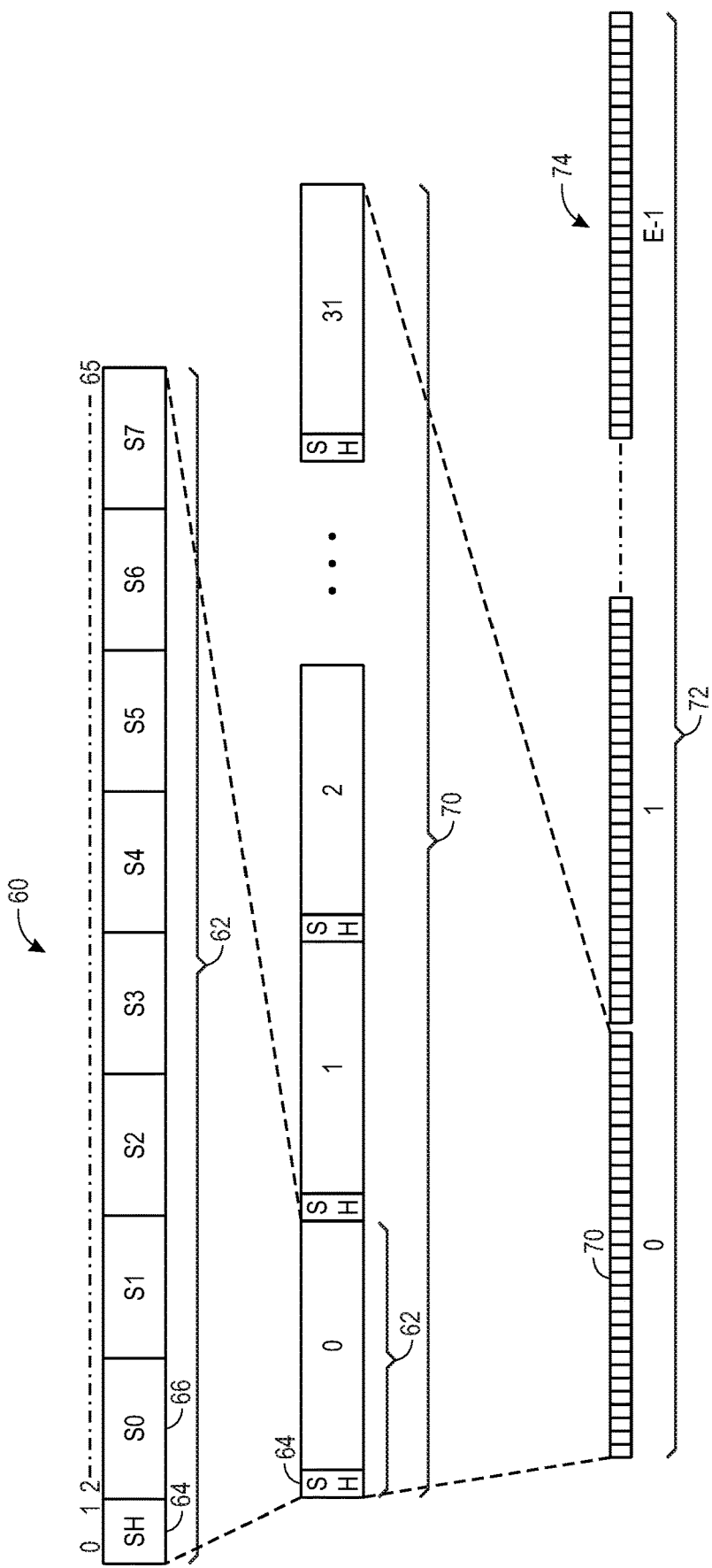
FIG. 3 is a schematic diagram of several arrangements of data, in accordance with an embodiment.

Data transmitted to the transceiver 36 of the programmable logic device 12 may be described as having a block structure. For example, FIG. 3 is a schematic diagram of several arrangements of data 60, which includes a block 62 of data. The blocks 62 include a sync header 64, which may include two bits of data, and several sub-blocks of data (e.g., first sub-block 66), which may each include eight bits of data. The sync header 64 may indicate the beginning of the block 62. That is, the sync header 64 may indicate a subdivision within data 60 received from the other circuitry 32. Accordingly, the block 62 may include sixty-six total bits, two of which are included the sync header 64 and sixty-four of which are the underlying data (e.g., data communicated to the programmable logic device 12 for processing by the logic 42).

Blocks 62 of the data 60 may be arranged in multiblocks, such as multiblock 70, which is also depicted in FIG. 3. For example, in the illustrated embodiment, thirty-two blocks of data may be concatenated to form the multiblock 70. As illustrated, each block 62 included in the multiblock 70 is separated from other blocks 62 by a sync header 64.

Multiblocks 70 may also be grouped together to form extended multiblocks, such as an extended multiblock 72, as illustrated in FIG. 3. Extended multiblocks 72 may include E multiblocks 70, where E is an integer equal to or greater than one. Also shown in FIG. 3 is an end of an extended multiblock 72, which may be the last multiblock 70 (E-1) included in an extended multiblock 72. As discussed below, the transceiver 36 may determine where the end of an extended multiblock 72 is located in data received from the other circuitry 32.

Figure 4:
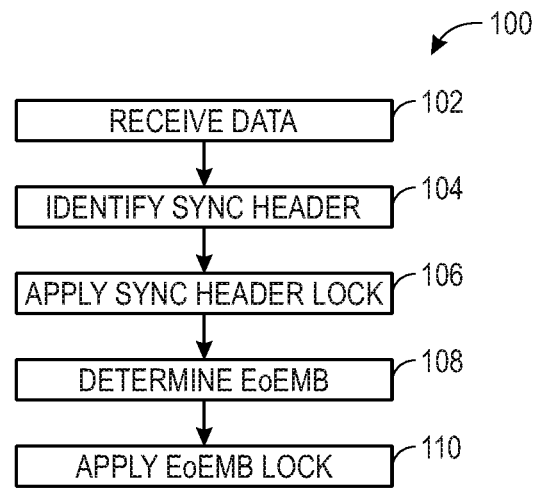
FIG. 4 is a process for aligning received data, in accordance with an embodiment.

As the transceiver 36 receives data (e.g., from the other circuitry 32), the transceiver 36 may process the data to determine subdivisions in the data 60, for example, to align encoded data. As discussed herein, the transceiver 36 may include circuitry that executes instructions to align sync headers and determine the location of an end of an extended multiblock. With this in mind, FIG. 4 is a flow diagram of a process 100 for aligning sync headers and extended multiblocks of data. The process 100 may be performed by the transceiver 36 of the programmable logic device 12, for instance, by executing instructions stored on the programmable logic device 12. The process 100 includes receiving data (process block 102), identifying a sync header (process block 104), applying a sync header lock (process block 106), determining an end of an extended multiblock (process block 108), and applying an end of extended multiblock lock (process block 110).

Figure 5:
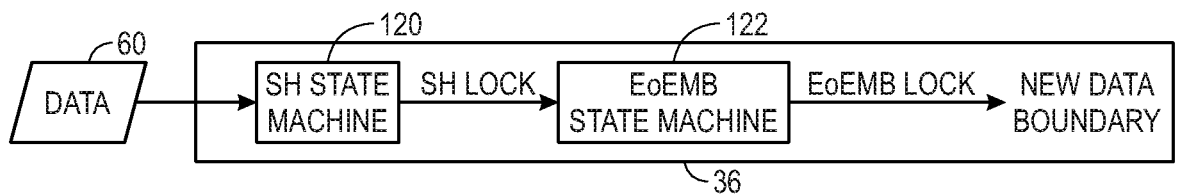
FIG. 5 is a block diagram of the receiver of FIG. 2, in accordance with an embodiment.

At process block 102, the programmable logic device 12 may receive data, which may be data 60 that is sent from the other circuitry 32 to the transceiver 36 of the programmable logic device 12. To help illustrate, FIG. 5 is a block diagram of the transceiver 36 performing the process 100. As illustrated, the transceiver 36 may receive data 60. As described below, the transceiver 36 may utilize a sync header state machine 120 and an end of extended multiblock state machine 122 to identify boundaries within the data 60.

As mentioned above, the transceiver 36 may include circuitry that executes instructions to determine the location of sync headers 64 and the location of ends 74 of extended multiblocks 72 included in the data 60. For example, the transceiver 36 may include a sync header state machine 120 and an end of extended multiblock state machine 122, each of which is discussed below in greater detail with respect to the process 100.

Returning to FIG. 4 and the discussion of the process 100, at process block 104, the transceiver 36 may identify a sync header 64 in the data 60. Additionally, at process block 106, the transceiver 36 may apply a sync header lock, for example, in response to identifying a sync header 64. Referring the FIG. 5, the sync header state machine 120 may receive the data 60 and identify a sync header 64. After identifying the sync header 64, the synch header state machine 120 may apply a sync header lock.

Figure 6:
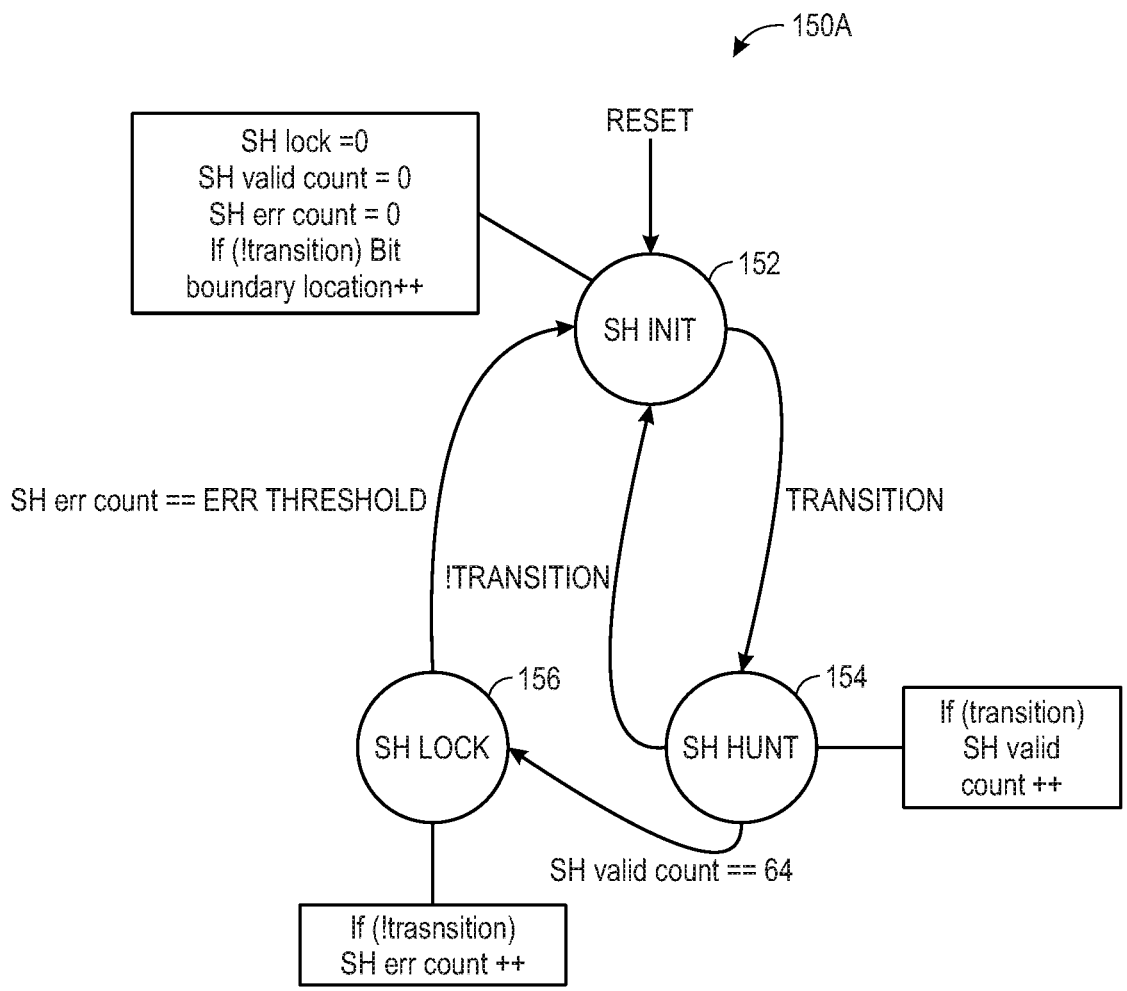
FIG. 6 is a diagram of an algorithm that may be utilized to apply a sync header lock, in accordance with an embodiment.
Figure 7:
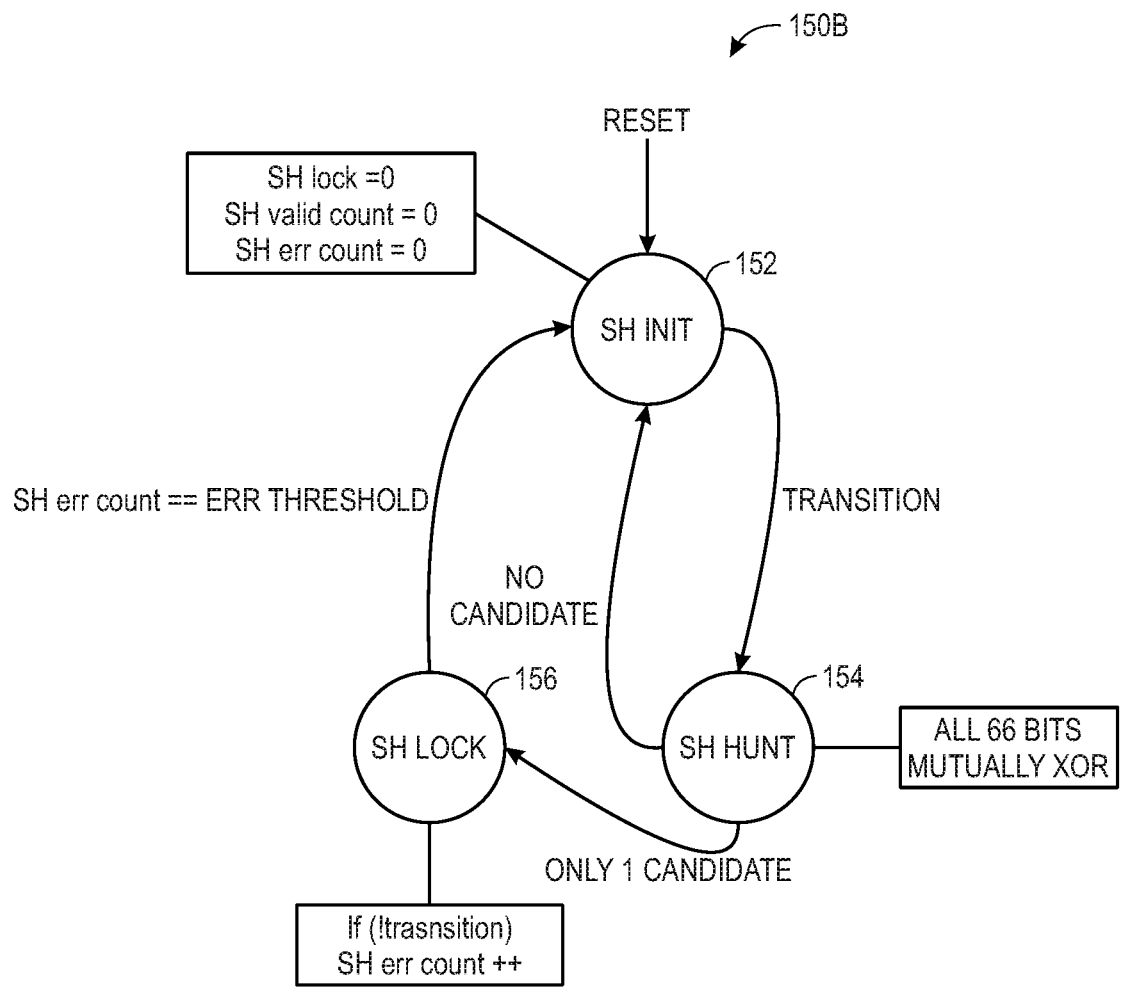
FIG. 7 is a diagram of another algorithm that may be utilized to apply a sync header lock, in accordance with an embodiment.

To help explain how the sync header state machine 120 may identify a sync header 64 and apply a sync header lock, FIG. 6 and FIG. 7 are provided. FIG. 6 illustrates an algorithm 150A that the sync header state machine may perform to identify a sync header 64 and apply a sync header lock. The transceiver 36 may utilize the algorithm 150A by executing machine-readable instructions stored on the transceiver 36.

As illustrated, the algorithm 150A includes three states: SH INIT 152, SH HUNT 154, and SH LOCK 156. SH INIT 152 is an initialization state during which the transceiver 36 may process the data 60 to search for bit transitions within the data 60. Transitions may be associated with sync headers 64. Upon detecting a transition (e.g., a transitioning from a "0" in a first bit of the data 60 to a "1" in the subsequent bit or "1" in the first bit to a "0" in the subsequent bit), the algorithm 150A may be proceed to the SH HUNT 154, in which the transceiver 36 may continue to search for transitions at a regular interval in the data 60, such as every n bits after transition is detected, where n is a blockwidth, which is the number of bits in the each block 62 of the data 60. For example, if a transition is detected at the first bit of the data 60 with blockwidths of thirty-two bits, the algorithm 150A may proceed to SH HUNT 154 and examine the thirty-third bit of the data 60 for a transition. In other words, after entering the SH HUNT 154 state, the first bit in the next block of the data 60 may be examined for a transition.

The algorithm 150A may remain in the SH HUNT 154 state to search for transitions at every $n^{th}$ bit until a threshold number of consecutive transitions are found or until no transition is detected before the threshold is reached. That is, the algorithm 150A may remain at SH HUNT 154 to search for indications of sync headers (e.g., bit transitions) at the same location within each block of data for a certain number of blocks. If no transition is detected before the threshold is reached, the algorithm 150A may return to SH INIT 152 to restart. For example, in the illustrated embodiment, the threshold may be 64. If no transition is detected at a bit where a transition is expected, the algorithm may return to SH INIT 152 and restart looking for transitions. However, when the threshold number of transitions are counted are in the SH HUNT 154 state (e.g., 64 consecutive transitions at bits where transitions are expected), the algorithm 150A may proceed to SH LOCK 156. Reaching the SH LOCK 156 corresponds to applying the sync header lock as depicted in process block 106 of the process 100 of FIG. 4. When SH LOCK 156 is reached, the transceiver 36 may continue with the process 100 to identify ends of extended multiblocks.

Each time the algorithm 150A is utilized to compare bits (e.g., identify a transition in a value from a first bit to a second bit) may utilize one clock cycle of the transceiver 36. Thus, when the data 60 is received and the sync headers 64 are located at the first and second bit of the data 60, 64 clock cycles will be utilized. However, while sync headers 64 may be located at the beginning of a block of data, the first two bits of received data 60 may not be included in a block of data. In other words, sync headers may be located at other locations within the data 60 because the data 60 may include other information. Moreover, because the algorithm 150A is restarted (e.g., transition from SH HUNT 154 back to SH INIT 152) when a transition is not detected, more clock cycles are needed when sync headers 64 are located elsewhere in the data 60 as the transceiver 36 receives the data 60.

FIG. 7 illustrates an algorithm 150B, which is another embodiment of the algorithm 150A that also includes the SH INIT 152, SH HUNT 154, and SH LOCK 156 states. In the illustrated embodiment, the algorithm may proceed from the SH INIT 152 without a transition being detected. Instead, the transceiver 36 may apply mutually exclusive or logic (XOR logic) to sixty-six bits of the data 60 at a time to determine where the sync headers 64 are located. In other words, during one clock cycle, at SH HUNT 164, the transceiver 36 may analyze sixty-six bits of the data 60 during a single clock cycle to identify possible transitions in the data 60. Several sequences of sixty-six bits may be analyzed to determine the location of sync headers 64 within the data 60. For example, the sync header 64 may be two bits of data having a "0" and a "1" (i.e., either "01" or "10"). Applying XOR logic to two such bits would return a value of 1 (e.g., "true"), meaning the associated two bits may be a sync header 64. For instance, the transceiver 36 may apply XOR logic to consecutive pairs of bits in an entire block 62, and the bit locations (e.g. bit position within the block 62) associated with a "1" when the XOR logic is applied may be considered possible or potential synch header locations.

Several sequences of the data 60 may be analyzed to determine the location of sync headers 64. For example, during a first clock cycle and for a first sequence of sixty-six bits of the data 60, applying the mutually exclusive XOR logic may result in several potential sync headers. That is, there may be several potential sync headers 64, such as any two consecutive bits that include a transition (e.g., "01" or "10"). During each subsequent clock cycle, sixty-six additional bits of the data 60 may be analyzed by applying the XOR logic (e.g., on entire blocks 62) until a single possible location of the sync header 64 is determined. For instance, potential sync headers may be determined within a second group of sixty-six bits of the data 60, a third group of sixty-six bits of the data 60, or more groups of sixty-six bits of the data 60. For each of these groups of sixty-six bits, the potential locations of the sync headers 64 in each of the groups of sixty-six bits of the data 60 may be determined.

The location of the sync headers 64 within the groups of sixty-six bits of the data 60 may be determined based on the potential sync header locations (e.g., places within the groups of sixty-six bits of the data 60 where transitions were detected). More specifically, because the sync headers 64 will be located in the same location within each group of sixty-six bits, after potential sync header locations in several groups of sixty-six bits of the data 60 have been determined, only a single potential sync header location may be determined to be present in each of the groups of sixty-six bits of the data 60. In other words, the transceiver 36 may continue analyzing sixty-six bits of the data 60 received from the other circuitry 32 and determine the location of the sync header 64 based on there being a single potential sync header location present in the same bit position in each of the groups of sixty-six bits of the data 60 that are analyzed. In other words, the transceiver 36 may analyze the data 60 block 62 by block 62 until only a single potential sync header location is present. For instance, after analyzing a first block, there may be three potential synch header locations. The transceiver 36 may determine that a second block (e.g., block 62 adjacent to the first block), has four potential sync header locations, two of which are shared with the first block (e.g., located in the same bit positions as potential sync headers in the first block). Furthermore, the transceiver 36 may determine that a third block (e.g., block 62 adjacent to the second block) has several potential sync header location, one of which is shared with both the first and second blocks. The transceiver 36 may identify the potential sync header location shared between the first, second, and third blocks as the sync header location. Once the location of the sync header 64 is identified, the algorithm may proceed to the SH LOCK 156 state. As discussed below, once at SH LOCK 156, the transceiver 36 may determine the end 74 of an extended multiblock 72.

However, before proceeding to discuss determining the ends 74 of extended multiblocks 72, data relating to determining sync headers 64 will first be discussed. As noted above, performing the embodiment of the algorithm depicted in FIG. 6 may result in the SH HUNT 154 state being entered several times before the SH LOCK 156 state can be entered, for instance, due to a transition not being detected in sixty-four consecutive blocks of the data 60. Bearing this in mind, FIG. 8 and FIG. 9 will be discussed.

Figure 8:
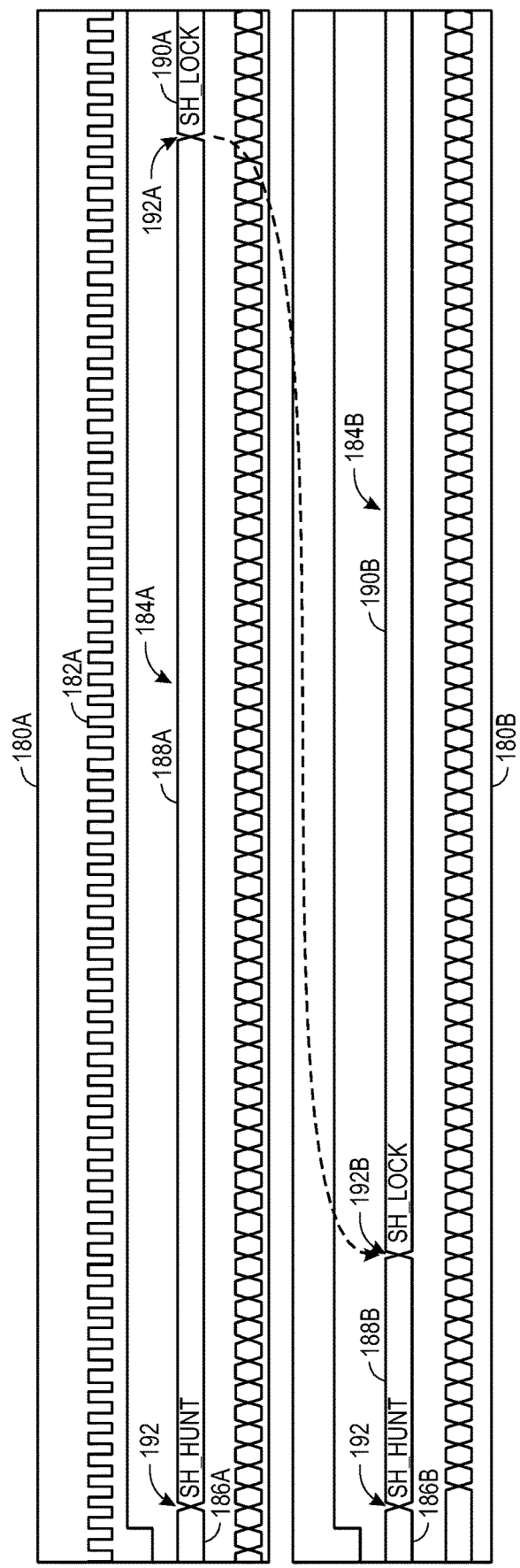
FIG. 8 is a timing diagram associated with performing a portion of the process of FIG. 4, in accordance with an embodiment.

FIG. 8 includes a first timing diagram 180A associated with performing the algorithm 150A on a set of data in which sync headers are located in the first two bit positions with each block of the data (e.g., at positions 0 and 1). FIG. 8 also includes a second timing diagram 180B associated with performing the algorithm 150B on the same set of data. In particular, line 182A shows the clock cycles for each of the timing diagrams 180. Section 184 indicates which state of the respective algorithm 150 the transceiver 36 is in at a particular time. More specifically, the section 184 includes subsections related to the SH INIT 152, SH HUNT 154, and SH LOCK 156 states. For example, a first subsection 186 corresponds to the SH INIT 152 state, a second subsection 188 corresponds to the SH HUNT 154 state, and the third subsection 190 corresponds to the SH LOCK 156 state. Points 192 indicate transitions between the subsections 186, 188, 190. A first point 192A indicates when the algorithm 150A transitions from SH HUNT 154 to SH LOCK 156, and a second point 192B indicates when the algorithm 150B transitions from SH HUNT 154 to SH LOCK 156. As illustrated, the algorithm 150B reaches the SH LOCK 156 state earlier than the algorithm 150A, indicating that the algorithm 150B operates more quickly. Moreover, as indicated by the subsection 224, the algorithm 150B spends less time at EMB HUNT 204 than the algorithm 200A.

Figure 9:
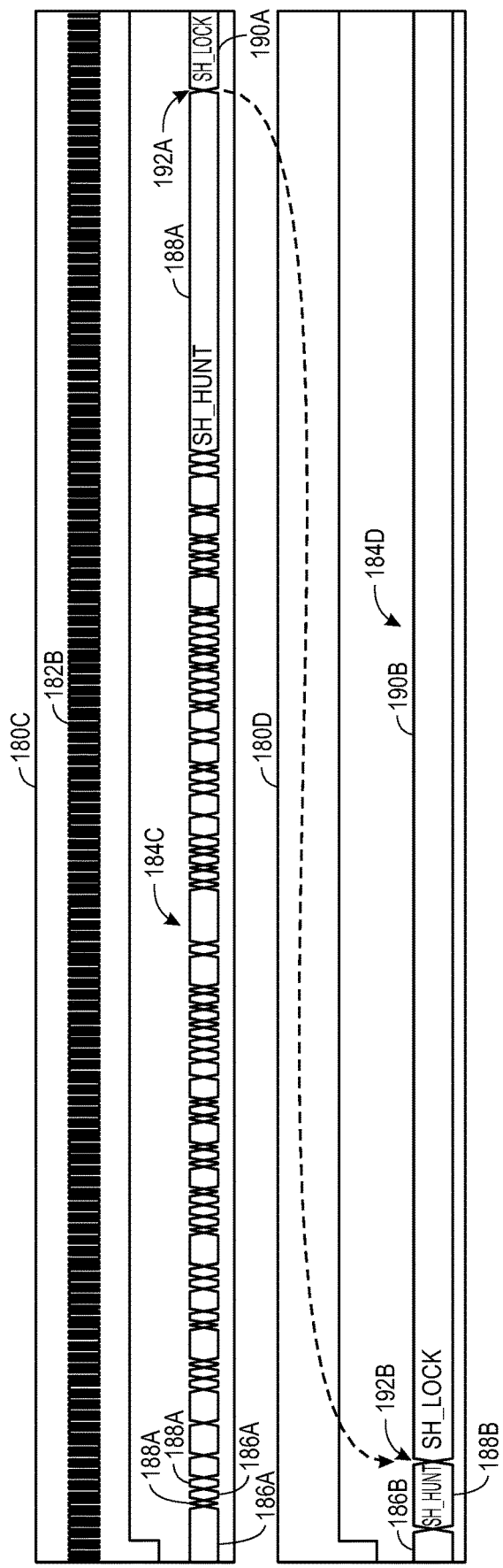
FIG. 9 is another timing diagram associated with performing a portion of the process of FIG. 4, in accordance with an embodiment.

Similar to FIG. 8, FIG. 9 also includes timing diagrams 180C and 180D, which are respectively associated with performing the algorithm 150A and algorithm 150B on data in which the sync headers are located at the last two bits of sixty-six bits of received data (e.g., bits located at position 64 and 65). As indicated by section 184C in the timing diagram 180C, performing the algorithm 150A when the sync header is located somewhere other than the beginning of received data may result in the algorithm 150A returning to the SH INIT 152 state multiple times. In contrast, as indicated by subsection 186D, performing the algorithm 150B results in the sync header being located much more quickly.

To help summarize the data included in FIG. 8 and FIG. 9 and indicate how much more quickly the algorithm 150B can identify sync headers relative to the algorithm 150A, Table 1 is provided below. In particular, Table 1 indicates that the algorithm 150B is able to enter the SH LOCK 156 state consistently earlier than the algorithm 150A.

TABLE 1

| Sync Header Location | Number of clock cycles to reach SH LOCK for algorithm 150A | Number of clock cycles to reach SH LOCK for algorithm 150B | Time Reduction |
|---|---|---|---|
| Beginning of data (e.g., bit 0) | 66 | 13 | 80.3% |
| End of data (e.g., bit 64) | 260 | 14 | 94.6% |

Figure 10:
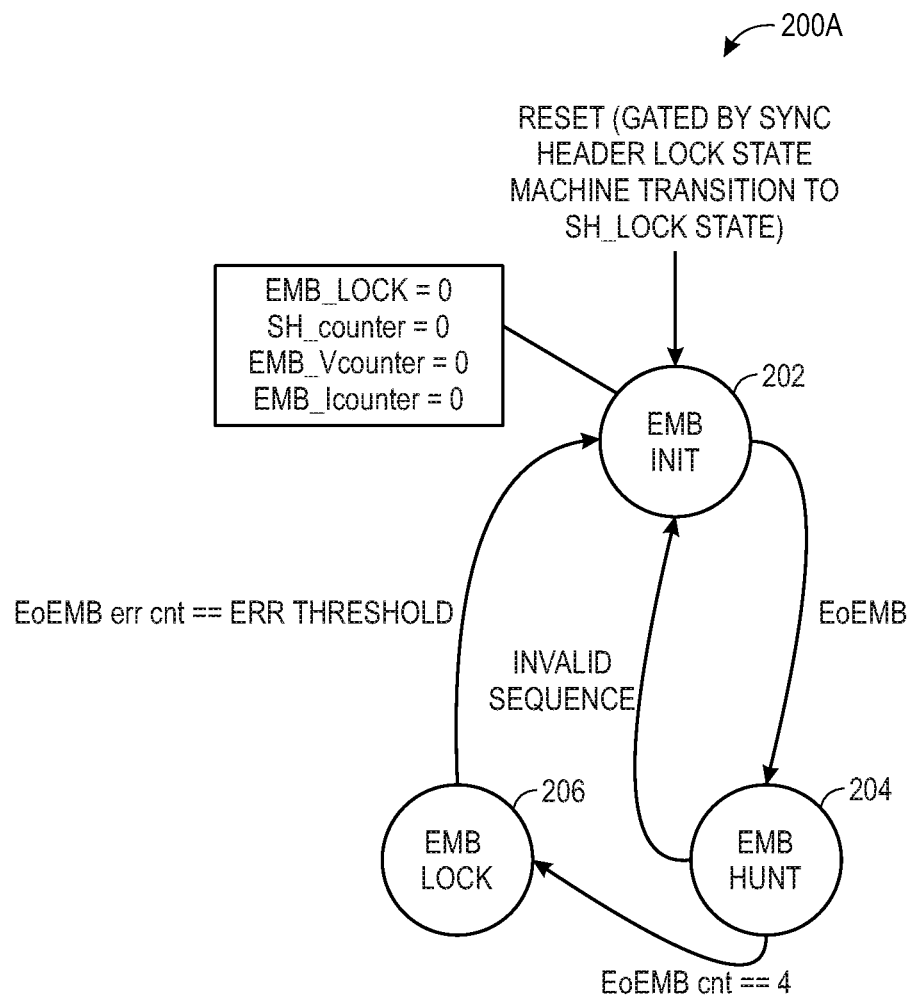
FIG. 10 is a diagram of an algorithm that may be utilized to apply an end of extended multiblock lock, in accordance with an embodiment.

Returning to FIG. 4 and the discussion of the process 100, at process block 108, the transceiver 36 of the programmable logic device 12 may determine the end of an extended multiblock, which is the last multiblock in an extended multiblock. Furthermore, when the programmable logic device 12 identifies the end 74 of an extended multiblock 72, at process block 110, the programmable logic device 12 may apply an end of extended multiblock lock. For instance, as illustrated in FIG. 5, the transceiver 36 may implement the end of extended multiblock state machine 122, which may receive the data 60 after the SH LOCK 156 has been applied. To further explain how the transceiver 36 may identify ends 74 of extended multiblocks 72 and apply the SH LOCK 156 to define boundaries in the data 60, FIG. 10 is provided. In particular, FIG. 10 is a diagram of an algorithm 200A that may be utilized to apply an end of extended multiblock lock. The transceiver 36 may utilize the algorithm 200A by executing machine-readable instructions stored on the transceiver 36 in order to determine ends 74 of extended multiblocks 72 and apply an end of extended multiblock lock.

As illustrated, the algorithm 200A includes three states: EMB INIT 202, EMB HUNT 204, and EMB LOCK 206. EMB INIT 202 is an initialization state during which the transceiver 36 may process the data 60 to search for ends 74 of extended multiblocks 72. For example, the transceiver 36 may count each sync header 64 in the data 60 expected to be in each extended multiblock 72, but the transceiver 36 may not begin counting until an end 74 of an extended multiblock 72 is identified. The transceiver 36 may determine an end 74 of an extended multiblock 72 based on the data 60. For example, the data 60 may include a pilot signal or sequence that indicates that end 74 of an extended multiblock 72. Different examples of pilot signals are discussed below with reference to Table 2 and Table 3.

TABLE 2

| Bit | Function |
|---|---|
| 0 | Data |
| 1 | Data |
| 2 | Data |
| 3 | 1 |
| 4 | Data |
| 5 | Data |
| 6 | Data |
| 7 | 1 |
| 8 | Data |

TABLE 2-continued

| Bit | Function |
|---|---|
| 9 | Data |
| 10 | Data |
| 11 | 1 |
| 12 | Data |
| 13 | Data |
| 14 | Data |
| 15 | 1 |
| 16 | Data |
| 17 | Data |
| 18 | Data |
| 19 | 1 |
| 20 | Data |
| 21 | 1 |
| 22 | EoEMB |
| 23 | 1 |
| 24 | Data |
| 25 | Data |
| 26 | Data |
| 27 | 0 |
| 28 | 0 |
| 29 | 0 |
| 30 | 0 |
| 31 | 1 |

TABLE 3

| Bit | Function |
|---|---|
| 0 | Data |
| 1 | Data |
| 2 | Data |
| 3 | Data |
| 4 | Data |
| 5 | Data |
| 6 | Data |
| 7 | Data |
| 8 | Data |
| 9 | Data |
| 10 | Data |
| 11 | Data |
| 12 | Data |
| 13 | Data |
| 14 | Data |
| 15 | Data |
| 16 | Data |
| 17 | Data |
| 18 | Data |
| 19 | Data |
| 20 | Data |
| 21 | Data |
| 22 | EoEMB |
| 23 | Data |
| 24 | Data |
| 25 | Data |
| 26 | Data |
| 27 | 0 |
| 28 | 0 |
| 29 | 0 |
| 30 | 0 |
| 31 | 1 |

Table 2 pertains to embodiments of the data 60 in CRC12 (where "CRC" stands for "cyclic redundancy check"), CRC3, and Command Channel formats, while Table 3 pertain to embodiments of the data in FEC format, with "FEC" standing for "forward error correction." In Table 2 and Table 3, there are several "bit" columns that indicate the bit number for bits within a bit word formed from the 32 sync transition bits that form a multiblock 70. The "function" columns indicate a purpose or value for a particular bit. For example, "data" indicates that the bit includes data (e.g., data transmitted from the other circuitry 32), while "0," "1," and "EoEMB" are pilot signals. Bits with a "1" before "EoEMB" may be included as part of the CRC12, CRC3, and Command Channel formats. "EoEMB" may indicate that the end 74 of an extended multiblock 72 is nearby or approaching. The "0" after "EoEMB" may indicate that a current multiblock is not the last multiblock in an extended multiblock 72. The "1" "after "EoEMB" may indicate that the corresponding multiblock is the last multiblock in an extended multiblock (i.e., the end 74 of an extended multiblock 72). For instance, bit 22 including "EoEMB" may indicate that the end 74 of an extended multiblock 72 is nearby in the data 60, and bits 27-31 including the sequence "00001" may indicate that multiblocks 70 corresponding to bits 27-30 are not the end 74 of an extended multiblock 72 but that a multiblock 70 corresponding to bit 31 is the end 74 of an extended multiblock 72.

During implementation of the algorithm 200A, the algorithm 200A may remain at EMB INIT 202 until an end of an extended multiblock is detected, at which points the algorithm 200A may proceed to EMB HUNT 204. For example, the transceiver may detect an end of an extended multiblock after detecting "EoEMB" following by "00001," where "EoEMB" may be equal to "1." In the EMB HUNT 204 state, the transceiver 36 may continue to parse through the data 60 to determine that every thirty-second bit corresponds to the end of a pilot signal transmission. The transceiver 36 may count the number of sequences that have an end of an extended multiblock, for example, to detect a pattern in the data 60. For example, in the EMB HUNT 204 state, the algorithm 200A may be utilized to determine ends 74 of extended multiblocks 72 that are equidistant from one another. In other words, the ends 74 of the extended multiblocks 72 should be detected at the same multiblock 70 with an extended multiblock 72 (e.g., detected at the first multiblock, second multiblock, etc.). In the illustrated embodiment, when the transceiver 36 implementing the algorithm 200A finds four consecutive valid sequences (e.g., "EoEMB" followed by "00001"), the algorithm 200A may proceed to EMB LOCK 206. Additionally, it should be noted that the algorithm 200A may return to EMB INIT 202 from EMB HUNT 204 and EMB LOCK 206 when an invalid sequence is detected (e.g., an invalid value of "EoEMB" is detected or no "00001" is detected" where one should be located). For example, at EMB HUNT 204, a single invalid sequence may cause the algorithm to return to EMB INIT 202, while at EMB LOCK 206, a threshold number (e.g., one or greater than one) of invalid sequences may be detected before returning to EMB INIT 202. Furthermore, when in the EMB LOCK 206 state, EMB LOCK 206 is applied, which means that the data 60 has been aligned. More specifically, the location of the sync headers 64 and the ends 74 of extended multiblocks 72 in the data 60 have been identified, and the transceiver 36 may proceed to perform other determinations on the data 60. For instance, the transceiver 36 may provide the data 60 to the logic 42 for further processing.

Figure 11:
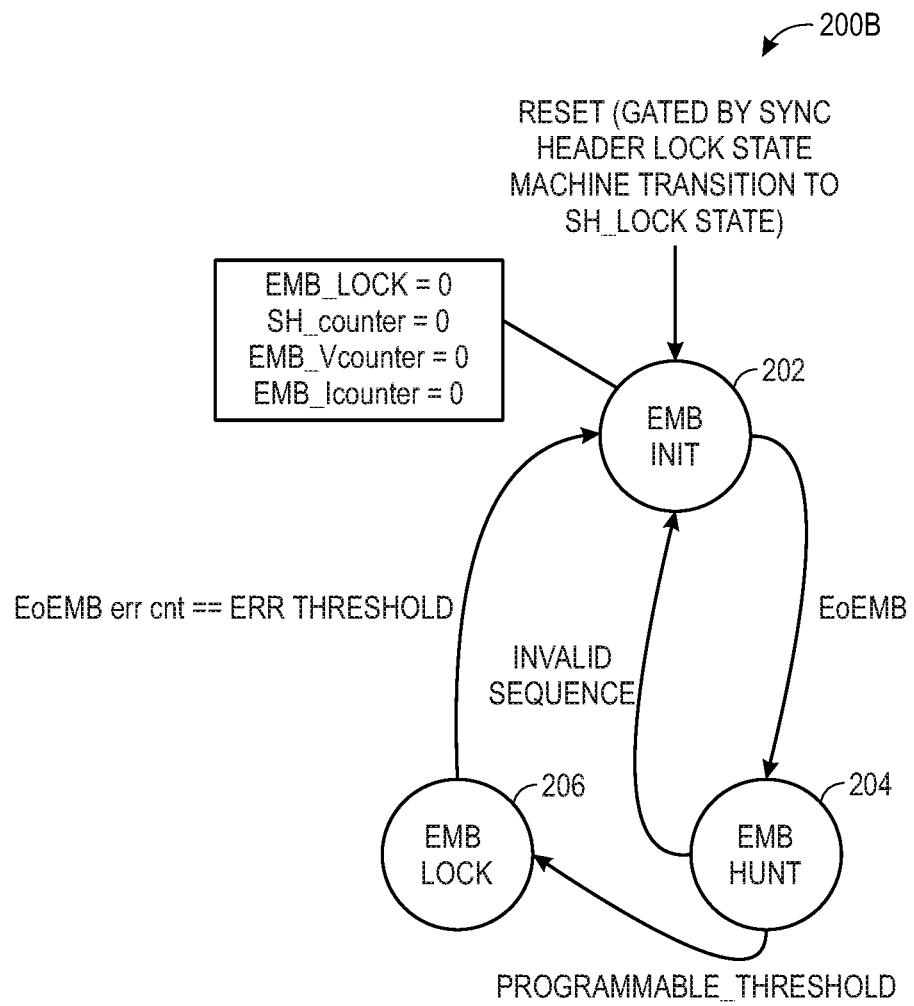
FIG. 11 is a diagram of another algorithm that may be utilized to apply an extended multiblock lock, in accordance with an embodiment.

Keeping the discussion of FIG. 10 in mind, FIG. 11 illustrates a diagram of an algorithm 200B, which is another embodiment of the algorithm 200A. In particular, the algorithm 200B differs from the algorithm 200A in that a programmable threshold for the number of valid sequences to be detected before proceeding from EMB HUNT 204 to EMB LOCK 206 is utilized. For instance, after identifying an end 74 of an extended multiblock 72, the algorithm 200 may proceed from EMB INIT 202 to EMB HUNT 204. At EMB HUNT 204, the algorithm 200 may determine whether "EoEMB" and "00001" are present where expected. In the algorithm 200A, when four such sequences are found without there being an invalid sequence, the algorithm 200A proceeds to EMB LOCK 206. In the algorithm 200B of FIG. 11, a user-selectable number of the valid sequences may be used instead of four. For instance, the user-selectable threshold may be one, two, three, four, or a value greater than four, and such a selection may be made using the design software 14. When the threshold is set to a value that is less than four, the transceiver 36 may reach the EMB LOCK 206 state sooner because the transceiver may process less of the data 60. In other words, because less of the data 60 will to analyzed in the EMB HUNT 204 state, the algorithm 200B may proceed to the EMB LOCK 206 state earlier than the algorithm 200A, which means the fewer processing resources of the transceiver 36 will be utilized and that the transceiver 36 may more efficiently reach the EMB LOCK 206 state.

Figure 12:
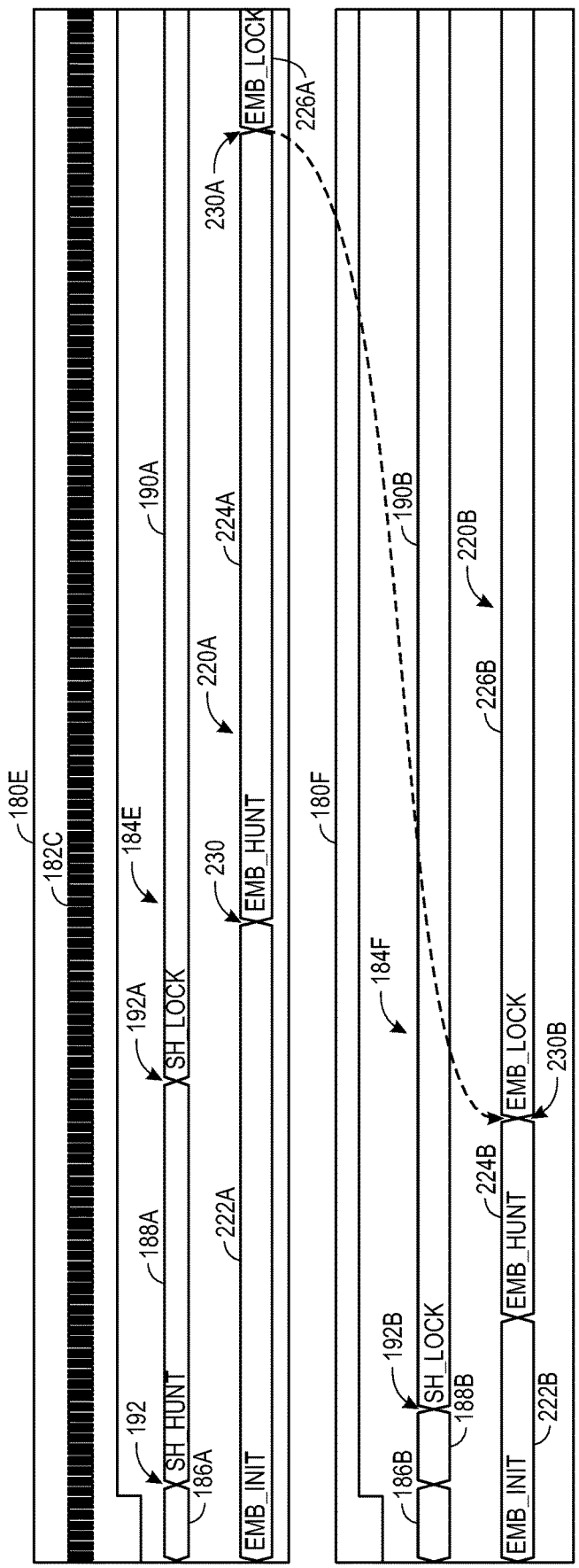
FIG. 12 is a timing diagram associated with performing the process of FIG. 4, in accordance with an embodiment.

Keeping the discussion of FIG. 10 and FIG. 11 in mind, FIG. 12 illustrates a timing diagram 180E on a set of data corresponding to data in which sync headers are located in the first two bit positions of each block of the data (e.g., at bit positions 0 and 1). The timing diagram 180E is associated with performing the algorithm 150A and the algorithm 200A. FIG. 12 also includes a fourth timing diagram 180F associated with performing the algorithm 150A and algorithm 200A on the same set of data when the user-selected number of valid sequences required to proceed from EMB HUNT 204 to EMB LOCK 206 is less than four. In particular, line 182C shows the clock cycles for each of the timing diagrams 180E, 180F. Section 184 indicates which state of the respective algorithm 150 the transceiver 36 is in at a particular time. More specifically, the section 184 includes subsections related to the SH INIT 152, SH HUNT 154, and SH LOCK 156 states. For example, a first subsection 186 corresponds to the SH INIT 152 state, a second subsection 188 corresponds to the SH HUNT 154 state, and the third subsection 190 corresponds to the SH LOCK 156 state. Points 192 indicate transitions between the subsections 186, 188, 190. A first point 192A indicates when the algorithm 150A transitions from SH HUNT 154 to SH LOCK 156, and a second point 192B indicates when the algorithm 150B transitions from SH HUNT 154 to SH LOCK 156.

Similarly, section 220 indicates which state of the respective algorithm 200 the transceiver 36 is in at a particular time. More specifically, the section 220 includes subsections related to EMB INIT 202, EMB HUNT 204, and EMB LOCK 206. For instance, a first subsection 222 corresponds to EMB INIT 202, a second subsection 224 corresponds to EMB HUNT 204, and a third subsection 226 corresponds to EMB LOCK 206. Points 230 indicate transitions between the subsections 222, 224, 226. For example, a first point 230A indicates when the algorithm 200A transitions from EMB HUNT 204 to EMB LOCK 206, and a second point 230B indicates when the algorithm 200B transitions from EMB HUNT 204 to EMB LOCK 206. As illustrated, the algorithm 200B reaches the EMB LOCK 206 state earlier than the algorithm 200A, indicating that the transceiver 36 operates more efficiently when the algorithm 150B and algorithm 200B are utilized compared to the algorithm 150A and algorithm 200A.

Figure 13:
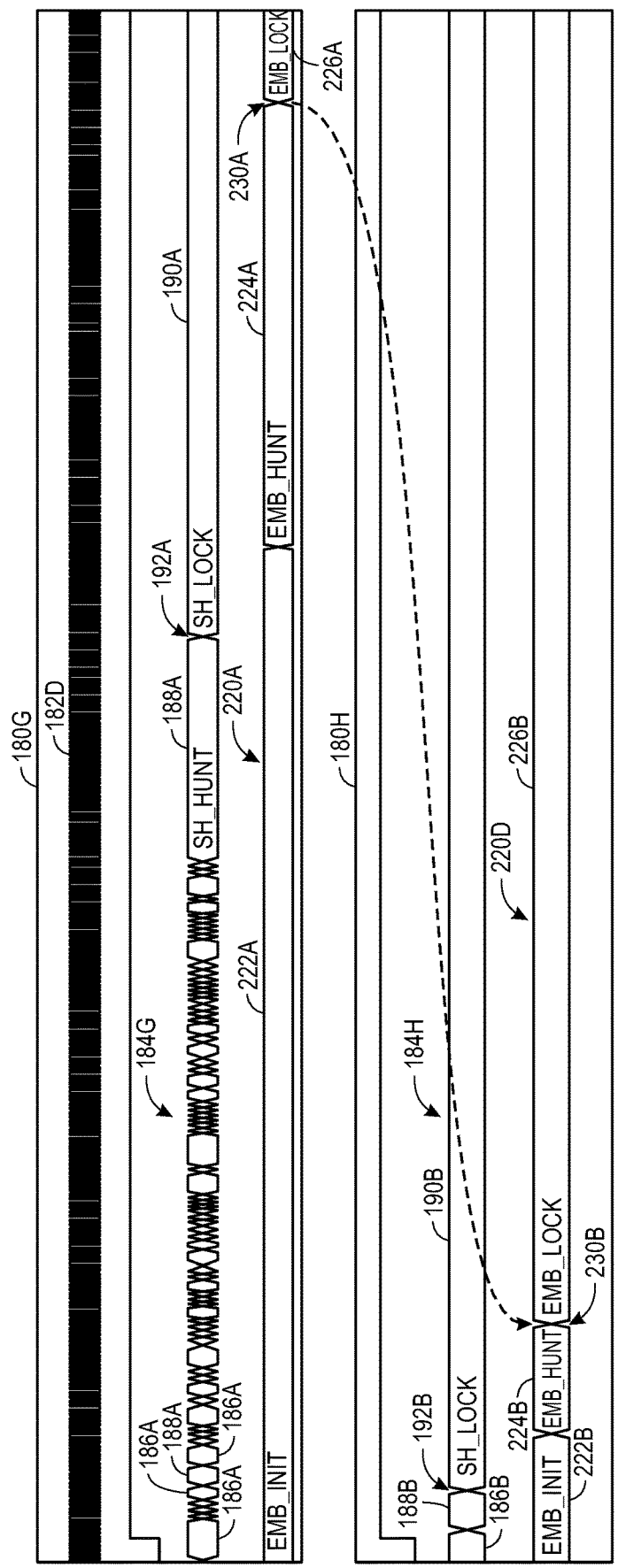
FIG. 13 is another timing diagram associated with performing the process of FIG. 4, in accordance with an embodiment.

Similar to FIG. 12, FIG. 13 also includes timing diagrams 180G and 180H, Timing diagram 180G is associated with performing the algorithm 150A followed by algorithm 200A on data in which the sync headers 64 are located at the last two bits of sixty-six bits of received data (e.g., bits located at position 64 and 65 within each block 62), while timing diagram 180H is associated with performing algorithm 150B followed by the algorithm 200B on the same data when the user-selected number of valid sequences required to proceed from EMB HUNT 204 to EMB LOCK 206 is less than four. As indicated by subsection 186A in the timing diagram 180H, performing the algorithm 150A when the sync headers 64 are located somewhere other than the beginning of received data may result in the algorithm 150A returning to the SH INIT 152 state multiple times. In contrast, as indicated by subsection 188B, performing the algorithm 150B results in the sync headers 64 being located much more quickly. Furthermore, because fewer valid sequences are required to proceed from EMB HUNT 204 to EMB LOCK 206, the amount of time associated with EMB HUNT 204 for the algorithm 200B (as indicated by subsection 224B) is less than the amount of time associated with EMB HUNT 204 for the algorithm 200A (as indicated by subsection 224A).

To help summarize the data included in FIG. 12 and FIG. 13 and indicate how much more quickly the transceiver 36 can process data 60 when utilizing algorithm 150B and algorithm 200B in comparison to algorithm 150A and algorithm 150B, Table 4 is provided below. In particular, Table 4 indicates that the transceiver 36 utilizing the algorithm 150B followed by the algorithm 200B is able to determine the data boundaries within the data 60 much more quickly compared to utilizing the algorithm 150A followed by the algorithm 200A.

TABLE 4

| Sync Header Location | Number of clock cycles to reach EMB LOCK using algorithm 150A and algorithm 200A | Number of clock cycles to reach EMB LOCK using algorithm 150B and algorithm 200B | Time Reduction |
| --- | --- | --- | --- |
| Beginning of data (e.g., bit 0) | 221 | 61 | 72.4% |
| End of data (e.g., bit 64) | 414 | 62 | 85.0% |

Figure 14:
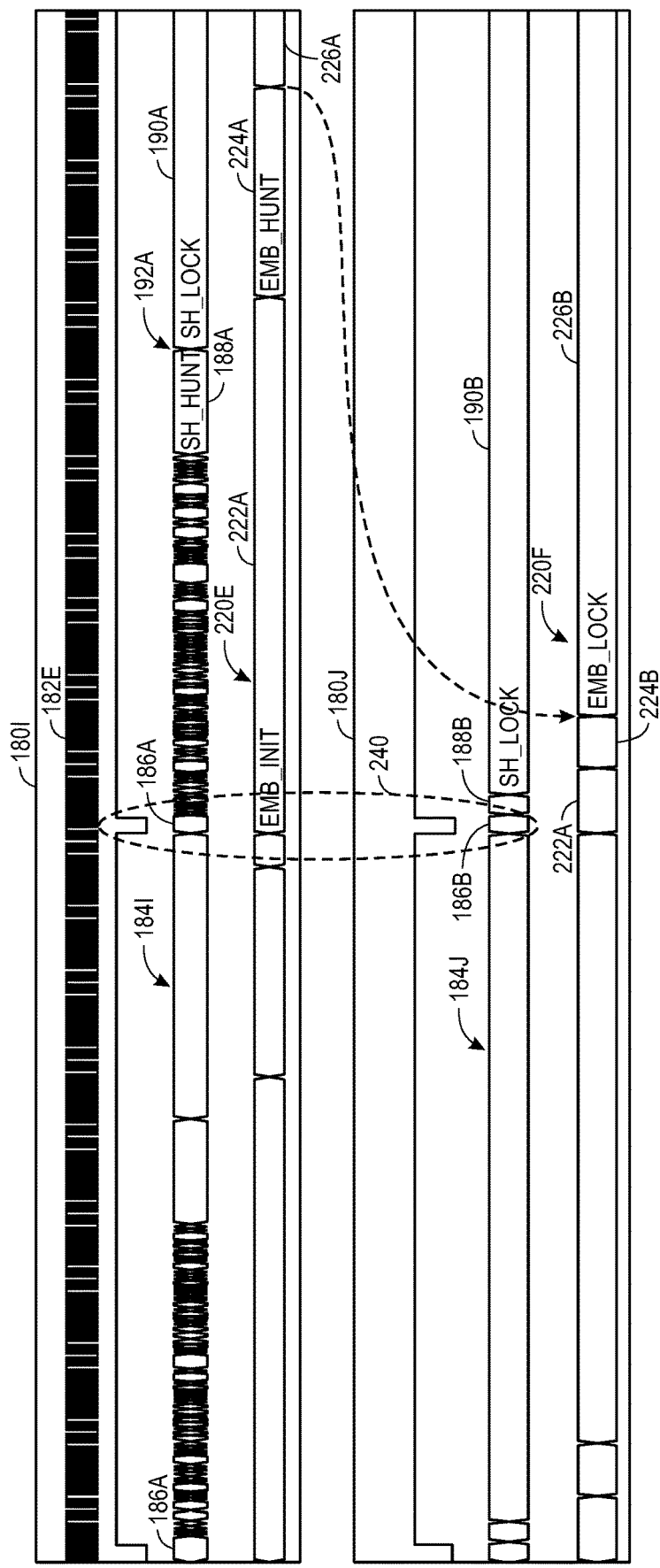
FIG. 14 depicts a timing diagram associated with a system reset, in accordance with an embodiment.

Continuing with the drawings, FIG. 14 illustrates two timing diagrams 180 that are related to a system reset 240 (e.g., resetting the programmable logic device 12). A timing diagram 180I is associated with utilizing the algorithm 150A and the algorithm 200A. FIG. 14 also includes a fourth timing diagram 180I associated with performing the algorithm 150B and algorithm 200B on the same set of data. In particular, line 182E shows the clock cycles for each of the timing diagrams 180. Section 184 indicates which state of the respective algorithm 150 the transceiver 36 is in at a particular time. More specifically, the section 184 includes subsections related to the SH INIT 152, SH HUNT 154, and SH LOCK 156 states. For example, a first subsection 186 corresponds to the SH INIT 152 state, a second subsection 188 corresponds to the SH HUNT 154 state, and the third subsection 190 corresponds to the SH LOCK 156 state. Points 192 indicate transitions between the subsections 186, 188, 190. A first point 192A indicates when the algorithm 150A transitions from SH HUNT 154 to SH LOCK 156, and a second point 192B indicates when the algorithm 150B transitions from SH HUNT 154 to SH LOCK 156.

Similarly, section 220 indicates which state of the respective algorithm 200 the transceiver 36 is in at a particular time. More specifically, the section 220 includes subsections related to EMB INIT 202, EMB HUNT 204, and EMB LOCK 206. For instance, a first subsection 222 corresponds to EMB INIT 202, a second subsection 224 corresponds to EMB HUNT 204, and a third subsection 226 corresponds to EMB LOCK 206. Points 230 indicate transitions between the subsections 222, 224, 226. For example, a first point 230A indicates when the algorithm 200A transitions from EMB HUNT 204 to EMB LOCK 206, and a second point 230B indicates when the algorithm 200B transitions from EMB HUNT 204 to EMB LOCK 206. As illustrated, the algorithm 200B reaches the EMB LOCK 206 state earlier than the algorithm 200A, indicating that the transceiver 36 operates more efficiently when the algorithm 150B and algorithm 200B are utilized compared to the algorithm 150A and algorithm 200A.

Figure 15:
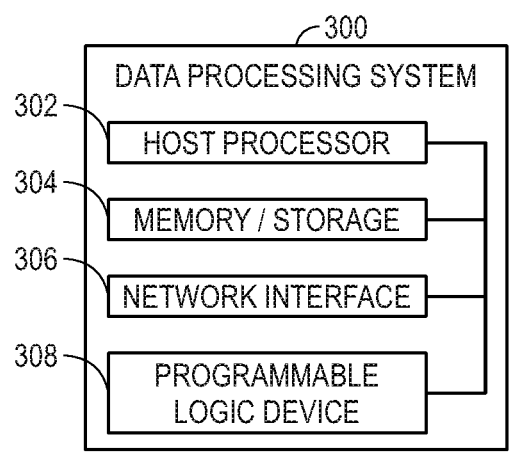
FIG. 15 is a block diagram of a data processing system, in accordance with an embodiment.

With the foregoing in mind, the programmable logic device 12 may be a part of a data processing system or may be a component of a data processing system that may benefit from using the techniques discussed herein. For example, the programmable logic device 12 may be a component of a data processing system 300, shown in FIG. 15. The data processing system 300 includes a host processor 302, memory and/or storage circuitry 304, and a network interface 306. The data processing system 300 may include more or fewer components (e.g., electronic display, user interface structures, application specific integrated circuits (ASICs)).

The host processor 302 may include any suitable processor, such as an INTEL® XEON® processor or a reduced-instruction processor (e.g., a reduced instruction set computer (RISC), an Advanced RISC Machine (ARM) processor) that may manage a data processing request for the data processing system 300 (e.g., to perform machine learning, video processing, voice recognition, image recognition, data compression, database search ranking, bioinformatics, network security pattern identification, spatial navigation, or the like). The memory and/or storage circuitry 304 may include random access memory (RAM), read-only memory (ROM), one or more hard drives, flash memory, or the like. The memory and/or storage circuitry 304 may be considered external memory to the programmable logic device 12 and may hold data to be processed by the data processing system 300 and/or may be internal to the programmable logic device 12. In some cases, the memory and/or storage circuitry 304 may also store configuration programs (e.g., bitstream) for programming a programmable fabric of the programmable logic device 12. The network interface 306 may permit the data processing system 300 to communicate with other electronic devices. The data processing system 300 may include several different packages or may be contained within a single package on a single package substrate.

In one example, the data processing system 300 may be part of a data center that processes a variety of different requests. For instance, the data processing system 300 may receive a data processing request via the network interface 306 to perform machine learning, video processing, voice recognition, image recognition, data compression, database search ranking, bioinformatics, network security pattern identification, spatial navigation, or some other specialized task. The host processor 302 may cause a programmable logic fabric of the programmable logic device 12 to be programmed with a particular accelerator related to the requested task. For instance, the host processor 302 may instruct that configuration data (e.g., bitstream 18) be stored on the memory and/or storage circuitry 304 or cached in sector-aligned memory of the programmable logic device 12 to be programmed into the programmable logic fabric of the programmable logic device 12. The configuration data may represent a circuit design for a particular accelerator function relevant to the requested task.

The processes and devices of this disclosure may be incorporated into any suitable circuit. For example, the processes and devices may be incorporated into numerous types of devices such as microprocessors or other integrated circuits. Exemplary integrated circuits include programmable array logic (PAL), programmable logic arrays (PLAs), field programmable logic arrays (FPLAs), electrically programmable logic devices (EPLDs), electrically erasable programmable logic devices (EEPLDs), logic cell arrays (LCAs), field programmable gate arrays (FPGAs), application specific standard products (ASSPs), application specific integrated circuits (ASICs), and microprocessors, just to name a few.

Moreover, while the process operations have been described in a specific order, it should be understood that other operations may be performed in between described operations, described operations may be adjusted so that they occur at slightly different times or described operations may be distributed in a system which allows the occurrence of the processing operations at various intervals associated with the processing, as long as the processing of overlying operations is performed as desired.

The embodiments set forth in the present disclosure may be susceptible to various modifications and alternative forms, specific embodiments have been shown by way of example in the drawings and have been described in detail herein. However, it may be understood that the disclosure is not intended to be limited to the particular forms disclosed. The disclosure is to cover all modifications, equivalents, and alternatives falling within the spirit and scope of the disclosure as defined by the following appended claims. In addition, the techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . " it is intended that such elements are to be interpreted under 35 U.S.C. 112(f). For any claims containing elements designated in any other manner, however, it is intended that such elements are not to be interpreted under 35 U.S.C. 112(f).

What is claimed is:

1. An electronic device comprising a receiver, wherein the receiver is configured to:
   receive data from a second electronic device;
   identify potential sync header locations within a portion of the data by performing a mutually exclusive or (XOR) logic operation on a plurality of sequential pairs of bits of the data; and
   identify sync headers in the data by determining which of the potential sync header locations is shared in subsequent portions of the data.

2. The electronic device of claim 1, wherein:
   the data comprises one or more extended multiblocks;
   each of the one or more extended multiblocks comprise at least one multiblock;
   the at least one multiblock comprises a plurality of blocks; and
   each block of the plurality of blocks comprises a sync header.

3. The electronic device of claim 2, wherein the portion of the data comprises an entire block of the plurality of blocks.

4. The electronic device of claim 2, wherein each block of the plurality of blocks comprises sixty-six bits of the data.

5. The electronic device of claim 2, wherein the receiver is configured to align the one or more extended multiblocks by:
   after identifying the sync headers, identifying a sequence of the data indicative of a first end of a first extended multiblock of the one or more extended multiblocks; and
   identifying a user-selected number of ends of extended multiblocks in the one or more extended multiblocks.

6. The electronic device of claim 5, wherein the user-selected number is one, two, or three.

7. The electronic device of claim 1, wherein the second electronic device comprises a transmitter configured to send the data to the receiver.

8. The electronic device of claim 1, wherein the electronic device comprises a programmable logic device.

9. The electronic device of claim 8, wherein the programmable logic device comprises a field programmable gate array (FPGA).

10. A non-transitory computer readable medium comprising instructions that, when executed, are configured to cause a programmable logic device to:
    receive data from an electronic device;
    identify potential sync header locations within a portion of the data by performing a mutually exclusive or (XOR) logic operation on a plurality of sequential pairs of bits of the data; and
    identify sync headers in the data by determining which of the potential sync header locations is shared in subsequent portions of the data.

11. The non-transitory computer readable medium of claim 10, wherein the instructions, when executed, are configured to cause the programmable logic device to identify the sync headers by:
    identifying the potential sync header locations in a first block of the data;
    determining one or more second potential sync header locations in a second block of the data; and
    determining which of the potential sync header locations and the one or more second potential locations occupy the same bit positions.

12. The non-transitory computer readable medium of claim 10, wherein:
    the data comprises a plurality of blocks; and
    the instructions, when executed, are configured to cause the programmable logic device to identify the sync headers by identifying the potential sync header locations within each block of the plurality of blocks until only one common potential sync header location is identified in each of the plurality of blocks.

13. The non-transitory computer readable medium of claim 10, wherein the instructions, when executed, are configured to cause the programmable logic device to determine the potential sync header locations by identifying one or more transitions between consecutive bits of the data.

14. The non-transitory computer readable medium of claim 10, wherein the instructions, when executed, are configured to cause the programmable logic device to align the data by:
    determining an end of a first extended multiblock of a plurality of extended multiblocks of the data; and
    determining a user-selected number of ends of extended multiblocks of the plurality of extended multiblocks after determining the end of the first extended multiblock.

15. The non-transitory computer readable medium of claim 14, wherein the instructions, wherein the user-selected number of ends is one, two, three, or four.

16. The non-transitory computer readable medium of claim 10, wherein the programmable logic device comprises a field programmable logic device (FPGA) or application specific integrated circuit (ASIC).

17. A computer-implemented method of aligning data, comprising:
    receiving, via an integrated circuit, data from an electronic device, wherein the data comprises one or more extended multiblocks, each of the one or more extended multiblocks comprises at least one multiblock, and the at least one multiblock comprises a plurality of blocks;
    identifying potential sync header locations within a portion of the data by performing a mutually exclusive or (XOR) logic operation on a plurality of sequential pairs of bits of the data;
    identifying sync headers in the data by determining which of the potential sync header locations is shared in subsequent portions of the data; and
    identifying one or more ends of the one or more extended multiblocks.

18. The computer-implemented method of claim 17, comprising:
    applying a sync header lock after identifying the sync headers; and
    identifying the one or more ends of the one or more extended multiblocks after applying the sync header lock.

19. The computer-implemented method of claim 18, wherein identifying the one or more ends of the one or more extended multiblocks comprises:
    identifying a first end of a first extended multiblock of the one or more extended multiblocks; and
    identifying a user-selected number of the one or more ends of the one or more extended blocks of the data after the first extended multiblock.

20. The computer-implemented method of claim 19, wherein:
    the integrated circuit comprises a programmable logic device; and
    the user-selected number is one, two, three, or four.

* * * * *